United States Patent [19]

Berta

[11] Patent Number: 4,948,840

[45] Date of Patent: Aug. 14, 1990

[54] THERMOPLASTIC ELASTOMER OF PROPYLENE POLYMER MATERIAL AND CROSSLINKED ETHYLENE-PROPYLENE RUBBER

[75] Inventor: Dominic A. Berta, New Castle County, Del.

[73] Assignee: Himont Incorporated, Wilmington, Del.

[21] Appl. No.: 436,504

[22] Filed: Nov. 14, 1989 (Under 37 CFR 1.47)

[51] Int. Cl.$^5$ .................... C08L 23/26; C08L 23/16; C08L 23/10

[52] U.S. Cl. .................... 525/193; 525/240; 525/232; 524/528

[58] Field of Search ................ 525/193, 240

[56] References Cited

U.S. PATENT DOCUMENTS

| | | | |
|---|---|---|---|
| Re. 31,518 | 2/1984 | Fischer | 525/194 |
| Re. 32,028 | 11/1985 | Fischer | 525/194 |
| 3,456,038 | 7/1969 | Newman et al. | 260/878 |
| 3,806,558 | 4/1974 | Fischer | 260/897 |
| 4,267,080 | 5/1981 | Yokoyama et al. | 525/193 |
| 4,732,940 | 3/1988 | Yamaoka et al. | 525/194 |
| 4,785,045 | 11/1988 | Yonekura et al. | 524/528 |
| 4,822,855 | 4/1989 | Kobayashi et al. | 525/240 |

OTHER PUBLICATIONS

Hercules Publication, Bulletin ORC-11OF, pp. 1-9, 1,2 Polybutadiene Resin Co-Agents for Peroxide Cure of Rubber Compounds. Author: J. W. Martin, pp. 275-271.

*Primary Examiner*—Carman J. Seccuro

[57] ABSTRACT

Disclosed is a dynamically partially cured thermoplastic elastomer comprising a propylene polymer material, an amorphous ethylene-propylene copolymer rubber, a semi-crystalline, low density, essentially linear ethylene-propylene copolymer and a curing system containing 1,2-polybutadiene and an organic peroxide and a method of making the same.

20 Claims, No Drawings

THERMOPLASTIC ELASTOMER OF PROPYLENE POLYMER MATERIAL AND CROSSLINKED ETHYLENE-PROPYLENE RUBBER

Field of Invention

This invention relates to a dynamically partially cured thermoplastic elastomer and a method of making the same.

BACKGROUND OF THE INVENTION

Thermoplastic elastomer of a polyolefin and a monoolefin copolymer rubber which are cured with an organic peroxide crosslinking agent alone or in the presence of a coagent are known. U.S. Pat. No. 3,456,038 discloses such a composition comprising an atactic polypropylene and an ethylene-propylene copolymer rubber (EPR) cured with a peroxide and a coagent. However, the reference teaches that only atactic polypropylene is compatible with EPR and not isotactic, crystalline polypropylene because isotactic polypropylene depolymerizes when admixed at elevated temperatures with peroxide curing agents, which produce free radicals. Also, the crystalline polypropylene has a high melting point and therefore, would not be compatible with the ethylene-propylene rubber at conventional curing temperatures of about 320° F.

U.S. Pat. No. 4,267,080 discloses a polyethylene composition comprising an ethylene polymer and a rubber and/or an elastomer with a crosslinking agent, such as an organic peroxide, and at least one crosslinking aid selected from the group consisting of 1,2-polybutadiene, triallyl cyanurate and triallyl isocyanurate. The use of a crystalline polypropylene, instead of polyethylene, in combination with the ethylene-propylene rubber is not taught or suggested by the reference.

In the above-mentioned references, the method of curing is static, not dynamic. However, it has been disclosed that a thermoplastic elastomer consisting of a polyolefin and a monoolefin copolymer rubber having desirable characteristics can be obtained by dynamically partially curing the two polymers. U.S. Pat. No. 3,806,558 describes the production of a thermoplastic elastomer by mixing a monoolefin copolymer rubber, typified by ethylene-propylene copolymer rubber (EPM) or ethylene-propylene-non-conjugated diene terpolymer rubber (EPDM), with a polyolefin resin, typified by polyethylene or polypropylene, and a conventional free radical generating curing agent alone or in conjunction with the usual coagents, while masticating the mixture resulting in a dynamically partially cured composition. The curing conditions are such that the composition is crosslinked to the state where it becomes almost insoluble in the usual solvents for uncured blends. Similarly, U.S. Pat. No. 4,732,940 and U.S. Pat. No. 4,785,045 disclose a dynamically partially cured composition comprising a polyolefin resin and a monoolefin copolymer rubber obtained by dynamically curing in the presence of an organic peroxide crosslinking agent and a crosslinking aid.

While the dynamically partially cured thermoplastic elastomer of the above-mentioned prior art give improved properties over thermoplastic elastomer statically cured, they still lack a good balance of overall properties, particularly tensile strength and modulus.

SUMMARY OF THE INVENTION

It has been found that by using a curative system containing peroxide and 1,2-polybutadiene, dynamically partially cured thermoplastic elastomers are produced having improved tensile strength, and modulus, and are useful in the manufacture of molded and extruded articles, such as, industrial hoses, automatic parts and sheeting.

Accordingly, the present invention provides a dynamically partially cured thermoplastic elastomer comprising, by weight, (a) 10 to 70 parts of a propylene polymer material, (b) 20 to 60 parts of amorphous ethylene-propylene copolymer rubber (EPR), (c) 10 to 30 parts of semi-crystalline, low density, essentially linear ethylene-propylene copolymer, wherein the total amount of (a)+(b)+(c) is 100 parts, and (d) a curing system, based on 100 parts of (a)+(b)+(c), containing (i) 3 to 15 parts of 1,2-polybutadiene and (ii) 0.5 to 3 parts of peroxide crosslinking agent.

In another embodiment, the present invention also relates to a method of preparing a dynamically partially cured thermoplastic elastomer comprising mixing (a) a propylene polymer material, (b) an ethylene-propylene copolymer rubber, (c) a semi-crystalline, low density, essentially linear ethylene-propylene copolymer and (d) a curing system comprising (i) a 1,2-polybutadiene and (ii) a peroxide crosslinking agent and masticating the mixture under conditions sufficient to substantially deplete all of the curing agent and dynamically partially cure the mixture.

DETAILED DESCRIPTION OF THE INVENTION

Unless otherwise specified all parts and percentages are by weight in this specification.

The propylene polymer material used in the present invention as component (a) includes (i) crystalline polypropylene having an isotactic index of greater than 90%, preferably from 95 to 98%; and (ii) an ethylene-propylene random copolymer having an ethylene content of up to 5%, preferably from about 1% up to about 3%, and is from about 90 to about 94% insoluble in xylene at room temperature. The propylene polymer material is present in an amount of from 10 to 70 parts, and preferably, from 30 to 50 parts.

Component (b) of the present invention is an amorphous ethylene-propylene copolymer rubber having an ethylene content of 40 to 60%. The ethylene-propylene copolymer rubber is present in amount of from 20 to 60 parts preferably from 30 to 50 parts.

The semi-crystalline, low density, essentially linear ethylene-propylene copolymer of component (c) consist substantially of units of ethylene, greater than 90%, preferably greater than 95%, and is insoluble in xylene at room temperature. The term "semi-crystalline" as used in this application is defined as a crystallinity of from about 22 to 55%, preferably about 25 to about 50%, as measured from the heat of fusion of (c) which is determined by differential scanning calorimetry on a 5 to 10 mg sample of (c) heated at 20° C./min. and assuming the heat of fusion of 100% crystalline polyethylene at 400° K. is 293 J/g as described in U. Gaur and B. Wunderlich, J. Phys. Chem. Ref. Data, 10 (1), 119 (1981). The percent crystallinity is calculated by dividing the heat of fusion of (c) by the heat of fusion of 100% crystalline polyethylene and multiplying by 100.

Component (c) is present in the amount of from 10 to 30 parts.

The total amount of (a)+(b)+(c) in the composition of the present invention is 100 parts.

In the curing system of the present invention, the 1,2-polybutadiene has a molecular weight of at least 1,300 to about 13,000, preferably, at least 2,400 to 13,000. The 1,2-vinyl content is at least 50%, and preferably 50 to 90%, and most preferably 70 to 90%. The amount of 1,2-polybutadiene present is from 3 to 15 parts, preferably 6 to 12 parts, based on 100 parts of (a)+(b)+(c). The 1,2-polybutadiene can be used in the liquid or solid supported form and is commercially available in both forms.

The peroxide crosslinking agent must have a half-life of 3.3 to 20 minutes, preferably 7 to 18 minutes, at 160° C. in ethylene-propylene-diene monomer rubber (EPDM). Suitable examples of peroxides used in the present invention include 1,1'-bis(t-butylperoxy-isopropyl)benzene, dicumyl peroxide, n-butyl-4,4'-bis(t-butylperoxy)valerate, and 2,5-di-(t-butylperoxy)-2,5-dimethylhexane. The peroxide is present in an amount, based on 100 parts of (a)+(b)+(c), of from 0.5 to 3 parts, preferably, from 1 to 2.5 parts, in liquid or solid supported form and are commercially available.

The dynamically partially cured thermoplastic elastomer according to the present invention are obtained by adding curing system (d) to a mixture of components (a), (b) and (c) and subjecting the mixture to curing conditions while masticating the mixture to bring about the desired dynamic partial cure.

Components (a), (b), and (c) form a homogeneous mixture prepared by first polymerizing propylene to form component (a) and then polymerizing propylene and ethylene in the presence of component (a) to form components (b) and (c). In the alternative, components (a), (b), and (c) can each be prepared separately and then mixed by melt-kneading.

The "partially cured", as referred to herein, means that the degree of curing, in terms of the gel content, is at least 80% and no more than 94% in cyclohexane. Preferably, the gel content is from 85 to 92%.

The mixing and/or mastication temperature is between 160° C. and 225° C., preferably 180° C. and 200° C., for a period of about 2 to 30 minutes, preferably 3 to 20 minutes, to bring about the dynamically partially cured thermoplastic elastomer of the present invention. At the above curing conditions at least 97% of the curing agent is depleted, generally 98 to 99%, based on the theoretical half-life at 160° C. in EPDM.

The mastication or shearing process can be carried out on an open roll, in an internal mixer (e.g., Banbury or Haake mixers), and single-screw or twin-screw extruders.

In preparing the thermoplastic elastomer of the present invention, the order in which the components are added and mixed is a critical aspect. According to a preferred method, a homogeneous mixture of components (a), (b), and (c) is prepared as described above, fluxed, 1,2-polybutadiene is then added in liquid or solid form, and mixing is continued until a homogeneous mixture is formed, approximately 1 to 2 minutes. When the 1,2-polybutadiene is added as a liquid, it is added in small increments of 25 to 50% over a period of 2 to 6 minutes and when it is added as a solid, it is added all at one time. Then the peroxide is added and mixed until there is no change in viscosity, about 5 to 7 minutes, indicating that substantially all the peroxide has been used. The mastication is then continued for an additional 1 to 2 minutes.

Another method of preparing the thermoplastic elastomer of this invention is where the components are premixed. In this method all of the components are premixed by tumble blending, e.g. in a Henschel mill or a V-blender. The premix is then charged to the chamber of a high intensity mixer, mixed until fluxed and constant viscosity is obtained, approximately 1 to 3 minutes, and mastication is continued for additional 1 to 2 minutes.

In addition, the curing system may further contain an additional coagent, such as, phenylene-bis-maleimide and/or sulfur donors, such mercaptobenzothiazole, benzothiazyldisulfide, tetramethylthiuram monosulfide, tetramethylthiuram disulfide, dipentamethylenethiuram hexasulfide, N,N'-diethylthiourea and zinc dibutyldithocarbamate. The amount of additional coagent used is in the range of 0.5 to 3 parts, preferably 1 to 2.5, and the amount of sulfur donor is in the range of about 0.15 to 3, preferably 0.17 to 2, parts, based on 100 parts of (a)+(b)+(c). The sulfur donors and the phenylene-bis-maleimide used in this invention are commercially available.

When the curing system further contains an additional coagent and/or sulfur donor, the coagent is added along with the 1,2-polybutadiene and the sulfur donor is added in combination with the peroxide.

In addition to the above major components, an antioxidant is generally present in the thermoplastic elastomer in an amount of from 0.1 to 0.9 parts, based on 100 parts of (a)+(b)+(c). Suitable examples of antioxidants used in this invention are thiophenols, 4,4'-thio-bis(6-t-butyl-m-cresol); phosphites, trisnonylphenyl phosphite; phenolic esters, tetrakismethylene-3-(3,5'-di-t-butyl-4'-hydroxyl-propionate)methane; thiodipropionates, dilaurylthiopropionate; hydroquinones, 2,5-di-t-butylhydroquinones; and quinolines, 2,2,4-trimethyl-1,2-dihydroquinoline all commercially available.

Also the thermoplastic elastomer of the present invention may contain other conventional additives, for example, extender oils, such as paraffinic and naphthenic oils, in an amount of from 20 to 50 parts, based on 100 parts of ethylene-propylene rubber or zinc oxide, in an amount of from 2 to 6 parts, based on 100 parts of (a)+(b)+(c).

The antioxidant, as well as, any other conventional additives, such as extender oil, zinc oxide or additional antioxidants, are added before the peroxide is added. When the thermoplastic elastomer is prepared by the premixed method, the extender oil is added after the premix is charged to the mixer and fluxing of the ingredients has begun.

The present invention will be illustrated in greater detail with reference to the examples of the invention set forth below. The physical properties in the following working examples and comparative examples were measured in the following manner.

| | |
|---|---|
| Tensile Strength | ASTM D-412 |
| Break Elongation | ASTM D-412 |
| 100% Modulus | ASTM D-412 |
| 200% Modulus | ASTM D-412 |
| Shore D Hardness | ASTM D-2240 |
| Compression Set | ASTM D-395, Method B |
| Melt Flow $I_{10}$ | ASTM D-1283 @ 230° C., 10 kg. wt. |

Percent gel content is determined by soaking a weighed 1.5 inch by 0.75 inch by 0.080 inch test specimen in about 100 ml of cyclohexane at about 23° C. for 48 hours, removing the sample and drying to constant weight (about 72 hours) in a vacuum oven at 80° C. The % gel was calculated as:

$$\% \text{ gel} = \frac{\left(\begin{array}{c}\text{Initial wt.}\\\text{of rubber}\end{array}\right) - \left(\begin{array}{c}\text{Wt. of rubber}\\\text{extracted}\end{array}\right)}{\text{Initial wt. of rubber (in sample)}} \times 100\%$$

EXAMPLE 1

This example illustrates the partially cured thermoplastic elastomer of this invention and a method of preparing same.

A Haake internal mixing head (Model 600E) set at a temperature between 181° C. to 183° C. and a mixing speed of 80 rpm was charged with 40 parts of crystalline polypropylene having an isotactic index of about 92, 40 parts of ethylene-propylene copolymer rubber having an ethylene content of about 50%, and 20 parts of semicrystalline, low density, essentially linear ethylene-propylene copolymer which is insoluble in xylene at room temperature and has an ethylene content of 96%. The ingredients were mixed until a homogeneous mixture was obtained (approximately 3 minutes), then 0.1 parts of 4,4'-thio-bis(6-t-butyl-m-cresol) and 6 parts of zinc oxide were added and the contents mixed for about 1 minute. Then 6 parts of 1,2-polybutadiene, in solid form, was added to the mixture and mixed for 1 minute. Then 1.1 parts of 1,1'-bis(t-butyl-peroxyisopropyl)benzene, in solid form, was added and mixing continued for approximately 9 minutes.

The mixture was then transferred onto compression mold bottom plattens, covered with top plattens and compression molded at 420° C. for 3 minutes at 15 tons pressure. The plattens were removed from the hot press and placed in a room temperature press and cooled under 15 tons pressure for about 15 minutes and then removed for testing.

Table 1 shows the physical properties of this dynamically partially cured thermoplastic elastomer of this example.

EXAMPLE 2

A dynamically partially cured thermoplastic elastomer was prepared according to the procedure and ingredients of Example 1 except that 12 parts of 1,2-polybutadiene was used instead of 6 parts. The physical properties are set forth in Table 1.

EXAMPLE 3

A dynamically partially cured thermoplastic elastomer was prepared according to the procedure and ingredients of Example 2 except that 3 parts of zinc oxide was used instead of 6 parts. The physical properties are set forth in Table 1.

COMPARATIVE EXAMPLE 4

A thermoplastic elastomer was prepared according to the procedure and ingredients of Example 1 except that no 1,2-polybutadiene was used. The physical properties are shown in Table 1.

COMPARATIVE EXAMPLE 5

A thermoplastic elastomer was prepared according to the procedure and ingredients of Example 1 except that 0.2 parts of sulfur was used instead of 1,2-polybutadiene. The physical properties are shown in Table 1.

COMPARATIVE EXAMPLE 6

A thermoplastic elastomer was prepared according to the procedure and ingredients of Example 1 except that 0.2 parts of sulfur and 3 parts of zinc oxide were used instead of 1,2-polybutadiene and 6 parts of zinc oxide. The physical properties are shown in Table 1.

TABLE I

| | Example Nos. | | | Comparative Ex. Nos. | | |
|---|---|---|---|---|---|---|
| | 1 | 2 | 3 | 4 | 5 | 6 |
| Ingredient | | | | | | |
| Polypropylene | 40 | 40 | 40 | 40 | 40 | 40 |
| Ethylene-Propylene Copolymer Rubber | 40 | 40 | 40 | 40 | 40 | 40 |
| Ethylene-Propylene Copolymer | 20 | 20 | 20 | 20 | 20 | 20 |
| Peroxide[1] | 1.1 | 1.1 | 1.1 | 1.1 | 1.1 | 1.1 |
| 1,2-polybutadiene[2] | 6* | 12** | 12** | — | — | — |
| Sulfur | — | — | — | — | 0.2 | 0.2 |
| 4,4'-thio-bis(6-t-butyl-m-cresol) | 0.1 | 0.1 | 0.1 | 0.1 | 0.1 | 0.1 |
| ZnO | 6 | 6 | 3 | 6 | 6 | 3 |
| Properties | | | | | | |
| 100% Modulus (psi) | 1380 | 1420 | 1430 | 978 | 1250 | 1231 |
| 200% Modulus (psi) | 1580 | 1610 | 1590 | — | — | 1362 |
| Tensile Stength (psi) | 1620 | 1720 | 1740 | 1022 | 1523 | 1509 |
| Elongation (%) | 230 | 240 | 260 | 138 | 280 | 322 |
| Shore D | 39 | 40 | 40 | 35 | 38 | 40 |
| Compression Set, (%) @ 100° C./22 hr. | 67 | 54 | 55 | 82 | 65 | 74 |
| $I_{10}$ | — | 1.2 | 1.3 | 8 | <0.1 | <0.1 |
| Gel, % | — | 92 | 94 | 80 | 93 | 94 |

[1]1,1'-bis(t-butylperoxyisopropyl)benzene, half-life of 15 min. @ 160° C. in EPDM, in solid form, supported on clay (40% active amount, 2.75 parts actual amount).
[2]1,2-vinyl content of 90%, 3200 mwt, solid form, supported on silica (65% active amount, *9 and **18 parts actual amount).

Examples 1–3 show an increase in modulus and tensile strength over Comparative Example 4 having no polybutadiene or sulfur and Comparative Examples 5 and 6 having only sulfur.

EXAMPLE 7

A dynamically partially cured thermoplastic elastomer was prepared according to the procedure and ingredients of Example 1 except that 0.73 benzothiazyl disulfide was added in combination with the peroxide, and 12 parts of 1,2-polybutadiene were used instead of 6 parts of 1,2-polybutadiene. The physical properties are set forth in Table 2.

EXAMPLE 8

A dynamically partially cured thermoplastic elastomer was prepared according to the procedure and ingredients of Example 1 except that 0.17 parts of dipentamethylenethiuram hexasulfide was added in combination with the peroxide and 12 parts of 1,2-polybutadiene was used instead of 6 parts 1,2-polybutadiene. The physical properties are set forth in Table 2.

EXAMPLE 9

A thermoplastic elastomer was prepared according to the procedure and ingredients of Example 1 except that 0.73 parts of mercaptobenzothiazole was added in combination with the peroxide and 12 parts of 1,2-polybutadiene was used instead of 6 parts of 1,2-polybutadiene. The physical properties are shown in Table 2.

EXAMPLE 10

A thermoplastic elastomer was prepared according to the procedure and ingredients of Example 1 except that 0.73 of tetramethylthiuram disulfide was added in combination with the peroxide and 12 parts of 1,2-polybutadiene was used instead of 6 parts of 1,2-polybutadiene. The physical properties are shown in Table 2.

EXAMPLE 11 polybutadiene was present. The physical data is shown in Table 2.

COMPARATIVE EXAMPLE 16

A thermoplastic elastomer was prepared according to the procedure and ingredients of Example 1 except 1.4 parts of phenylene-bis-maleimide was used instead of 6 parts of 1,2-polybutadiene. The physical data is shown in Table 2.

COMPARATIVE EXAMPLE 17

A thermoplastic elastomer was prepared according to the procedure and ingredients of Example 5 except 0.2 parts of dipentamethylenethiuram hexasulfide was used and no 1,2-polybutadiene. The physical data is shown in Table 2.

TABLE 2

| | Example Nos. | | | | | | | | Comparative Ex. Nos. | | |
|---|---|---|---|---|---|---|---|---|---|---|---|
| | 7 | 8 | 9 | 10 | 11 | 12 | 13 | 14 | 15 | 16 | 17 |
| Ingredients | | | | | | | | | | | |
| Propylene | 40 | 40 | 40 | 40 | 40 | 40 | 40 | 40 | 40 | 40 | 40 |
| Ethylene-Propylene Copolymer Rubber | 40 | 40 | 40 | 40 | 40 | 40 | 40 | 40 | 40 | 40 | 40 |
| Ethylene-Propylene Copolymer | 20 | 20 | 20 | 20 | 20 | 20 | 20 | 20 | 20 | 20 | 20 |
| Peroxide[1] | 1.1 | 1.1 | 1.1 | 1.1 | 1.1 | 1.1 | 1.1 | 1.1 | 1.1 | 1.1 | 1.1 |
| 1,2-polybutadiene[2] | 12* | 12* | 12* | 12* | 12* | 3** | 6*** | 12* | — | — | — |
| 4,4'-thio-bis(6-t-butyl-m-cresol) | 0.1 | 0.1 | 0.1 | 0.1 | 0.1 | 0.1 | 0.1 | 0.1 | 0.1 | 0.1 | 0.1 |
| ZnO | 6 | 6 | 6 | 6 | 6 | 6 | 6 | 6 | 6 | 6 | 6 |
| MBTS[3] | 0.73 | — | — | — | — | 0.7 | 10 0.7 | 0.7 | — | — | — |
| MBT[4] | — | — | 0.73 | — | — | — | — | — | — | — | — |
| TMTD[5] | — | — | — | 0.73 | — | — | — | — | — | — | — |
| Dipentamethylene-thiuram hexasulfide | — | 0.17 | — | — | — | — | — | — | — | — | 0.2 |
| PBM[6] | — | — | — | — | 2* | 2* | 2* | 2* | — | 1.4** | — |
| Properties | | | | | | | | | | | |
| 100% Modulus (psi) | 1360 | 1350 | 1250 | 1220 | 1480 | 1205 | 1290 | 1342 | 978 | 1030 | 1070 |
| 200% Modulus (psi) | 1495 | 1520 | 1380 | 1360 | 1630 | 1380 | 1430 | 1500 | — | — | — |
| Tensile Strength (psi) | 1590 | 1650 | 1501 | 1540 | 1695 | 1630 | 1670 | 1680 | 1022 | 1100 | 1400 |
| Elongation (%) | 310 | 250 | 350 | 355 | 245 | 420 | 410 | 340 | 138 | 360 | 167 |
| Shore D | 42 | 38 | 39 | 38 | 43 | 38 | 38 | 40 | 35 | 35 | 37 |
| Compression Set (%) 100° C./22 hr. | 53 | 55 | 56 | 57 | 54 | 63 | 62 | 58 | 82 | 63 | 68 |
| $I_{10}$ | 1.1 | 0.6 | 2.2 | 0.8 | 1.0 | 1.8 | 1.2 | 0.9 | 1.0 | 7.0 | 2.0 |
| Gel, % | 92 | — | — | — | 92 | 90 | 90 | 91 | 80 | 89 | 87 |

[1] 1,1'-bis(t-butylperoxyisopropyl)benzene, half-life of 15 min. @ 160° F. in EPDM, solid form, supported on clay (40% active amt., 2.75 parts actual amt.)
[2] 1,2-vinyl content of 90%, 3200 m wt., solid form, supported on silica (65% active amt., *18 parts actual amt., 4.5 parts actual amt., *9 parts actual amt.)
[3] Benzothiazyl disulfide
[4] Mercaptobenzothiazole
[5] Tetramethylthiuram disulfide
[6] Phenylene-bis-maleimide, solid form, (70% active amt. with 30% oil *2.8 parts actual amt., **2.0 parts actual amt.)

A dynamically partially cured thermoplastic elastomer was prepared according to procedure and ingredients of Example 1 except that 2 parts of phenylene-bis-maleimide was added in combination with 12 parts of 1,2-polybutadiene instead of only 6 parts of 1,2-polybutadiene. The physical data of this thermoplastic elastomer is set forth in Table 2.

EXAMPLES 12-14

A dynamically partially cured thermoplastic elastomer prepared according to the procedure and ingredients of Example 1 except that 2 parts of phenylene-bis-maleimide was added in combination with 3, 6, and 12 parts of 1,2-polybutadiene and 0.7 parts of benzothiazyl disulfide was added together with the peroxide. The physical properties are shown in Table 2.

COMPARATIVE EXAMPLE 15

A thermoplastic elastomer was prepared according to procedure and ingredients of Example 1 except no 1,2-polybutadiene was present. The physical data is shown in Table 2.

As demonstrated above, the dynamically partially cured thermoplastic elastomer of the present invention having a curing system containing a peroxide and 1,2-polybutadiene have a better overall balance of properties than comparative compositions where no polybutadiene is used in the curing system.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A dynamically partially cured thermoplastic elastomer comprising, by weight, (a) 10 to 70 parts of a propylene polymer material selected from the group consisting of (i) crystalline polypropylene having an isotactic index of greater than 90% and (ii) an ethylene-propylene random copolymer having an ethylene content of up to about 5%, (b) 20 to 60 parts of an amorphous ethylene-propylene copolymer rubber, (c) 10 to 30 parts of a semi-crystalline, low density, essentially linear ethylene-propylene copolymer, xylene insoluble at room temperature, wherein the total amount of (a)+(b)+(c) is 100 parts, and (d) a curing system, based on 100 parts of (a)+(b)+(c), containing (i) 3 to 15 parts of 1,2-polybutadiene, (ii) 0.5 to 3 parts of a peroxide crosslinking agent having a half-life of 3.3 to 20 min. at 160° C. in EPDM.

2. The thermoplastic elastomer of claim 1 wherein said peroxide is selected from the group consisting of 1,1'-bis-(t-butylperoxyisopropyl)benzene, dicumyl peroxide, n-butyl-4,4'-bis(t-butyl-peroxy)valerate, and 2,5-di-(t-butylperoxy)-2,5-dimethylhexane.

3. The thermoplastic elastomer of claim 1 wherein said 1,2-polybutadiene has a 1,2-vinyl content in the range of from 70 to 90 percent and a molecular weight in the range of 1,300 to 13,000.

4. The thermoplastic elastomer of claim 1 further comprising an antioxidant present in the amount of 0.1 to 0.9 parts, and zinc oxide present in the amount of 2 to 6 parts, based on 100 parts of (a)+(b)+(c).

5. The thermoplastic elastomer of claim 1 wherein said curing system (d) further comprises a sulfur donor present in the amount of from 0.15 to 3 parts, based on 100 parts of (a)+(b)+(c).

6. The thermoplastic elastomer of claim 5 wherein the sulfur donors are selected from the group consisting of mercaptobenzothiazole, benzothiazyldisulfide, tetramethylthiuram monosulfide, tetramethylthiuram disulfide, dipentamethylenethiuram hexasulfide, N,N'-diethylthiourea and zinc dibutyldithiocarbamate.

7. The thermoplastic elastomer of claim 5 wherein said curing system (d) further comprises 0.5 to 3 parts of phenylene-bis-maleimide, based on 100 parts of (a)+(b)+(c).

8. The thermoplastic elastomer of claim 1 comprising (a) 30 to 60 parts crystalline polypropylene, (b) 30 to 50 parts amorphous ethylene-propylene copolymer rubber, (c) 10 to 20 parts semi-crystalline, low density, essentially linear ethylene-propylene copolymer and (d) a curing system containing (i) 6 to 12 parts 1,2-polybutadiene and (ii) 1 to 2.2 parts 1,1'-bis(t-butylperoxyisopropyl)benzene.

9. A method of making a dynamically partially cured thermoplastic elastomer comprising continuously mixing, by weight, (a) 10 to 70 parts of a propylene polymer material selected from the group consisting of (i) crystalline polypropylene having an isotactic index of greater than 90% and (ii) an ethylene-propylene random copolymer having an ethylene content of up to about 5%, (b) 20 to 60 parts of an amorphous ethylene-propylene copolymer rubber, and (c) 10 to 30 parts of a semi-crystalline, low density, essentially linear ethylene-propylene copolymer, which is insoluble in xylene at room temperature, with (d) a curing system comprising (i) 3 to 15 parts of 1,2-polybutadiene, based on 100 parts of (a)+(b)+(c) and (ii) a peroxide crosslinking agent in the amount of 0.5 to 3 parts, based on 100 parts of (a)+(b)+(c), having a half-life of 3.3 to 20 min. at 160° C. in EPDM and at a temperature between 160° C. and 225° C. for a time period sufficient to substantially deplete all of the curing agent and to partially cure the mixture.

10. The method according to claim 9 further comprising adding an antioxidant in the amount of 0.1 to 0.9 parts, based on 100 parts of (a)+(b)+(c), before mixing is commenced.

11. The method according to claim 10 further comprising adding a sulfur donor selected from the group consisting of mercaptobenzothiazole, benzothiazyldisulfide, tetramethylthiuram monosulife, dipentamethylenethiuram hexasulfide, N,N'-diethylthiourea, and zinc dibutyldithiocarbamate, in an amount of 0.15 to 3 parts, based on 100 parts of (a)+(b)+(c), before mixing is commenced.

12. The method according to claim 11 further comprising adding 0.5 to 3 parts, based on 100 parts of (a)+(b)+(c), phenylene-bis-maleimide before mixing is commenced.

13. A method of making a dynamically partially cured thermoplastic elastomer comprising mixing, by weight, (a) 10 to 70 parts of a propylene polymer material selected from the group consisting of (i) crystalline polypropylene having an isotactic index of greater than 90% and (ii) an ethylene-propylene random copolymer having an ethylene content of up to about 5%, (b) 20 to 60 parts of ethylene-propylene copolymer rubber and (c) 10 to 30 parts of semi-crystalline, low density, essentially linear ethylene-propylene copolymer which is insoluble in xylene at room temperature, are mixed to form a homogeneous mixture, then adding to said homogeneous mixture 3 to 15 parts, based on 100 parts of (a)+(b)+(c), of 1,2-polybutadiene and mixing to form a homogeneous mixture, then adding a peroxide crosslinking agent in the amount of 0.5 of 3 parts, based on 100 parts of (a)+(b)+(c), having a half-life of 3.3 to 20 min. at 160° C. in EPDM to the resulting homogeneous mixture, and continuing the mastication at a temperature between 160° C. and 225° C. for a time period sufficient to substantially deplete all of the crosslinking agent and partially cure the mixture, wherein mixing is continuous through all steps.

14. The method according to claim 13 wherein said 1,2-polybutadiene is in liquid form and is added incrementally.

15. The method according to claim 13 further comprising adding an antioxidant and zinc oxide to the homogeneous mixture before the 1,2-polybutadiene.

16. The method according to claim 15 further comprising adding 0.15 to 3 parts, based on 100 parts of (a)+(b)+(c), of a sulfur donor selected from the group consisting of mercaptobenzothiazole, benzothiazyldisulfide, tetramethylthiuram monosulfide, tetramethylthiuram disulfide, dipentamethylenethiuram hexasulfide, N,N'-diethylthiourea and zinc dibutyldithiocarbamate in combination with the peroxide crosslinking agent.

17. The method according to claim 15 further comprising adding 0.5 to 3 parts, based on 100 parts of (a)+(b)+(c), of phenylene-bis-maleimide in combination with 1,2-polybutadiene.

18. The method according to claim 13 comprising mixing, by weight (a) 30 to 60 parts crystalline polypropylene, (b) 30 to 50 parts amorphous ethylene-propylene copolymer rubber, and (c) 10 to 20 parts semi-crystalline, low density, essentially linear ethylene-propylene copolymer and (d) a curing system containing (i) 6 to 12 parts 1,2-polybutadiene and (ii) 1 to 2.2 parts 1,1'-bis(t-butylperoxyisopropyl)benzene.

19. The method according to claim 18 wherein said curing system further comprises adding 0.15 to 3 parts of a sulfur donor in combination with the 1,1'-bis(t-butylperoxyisopropyl)benzene.

20. The method according to claim 19 wherein said curing system further comprises adding 0.5 to 3 parts phenylene-bis-maleimide in combination with the 1,2-polybutadiene.

* * * * *